United States Patent [19]

Asada et al.

[11] Patent Number: 4,879,921
[45] Date of Patent: Nov. 14, 1989

[54] TRANSAXLE CASING FOR AUTOMATIC TRANSMISSION

[75] Inventors: Toshiyuki Asada, Susono; Seitoku Kubo, Toyota; Shinya Nakamura, Owariasahi; Masafumi Kinoshita, Toyota; Takaaki Kuroda, Hirokawa, all of Japan

[73] Assignee: Toyota Jidosha Kabushiki Kaisha, Aichi, Japan

[21] Appl. No.: 162,593

[22] Filed: Mar. 1, 1988

[30] Foreign Application Priority Data

Mar. 4, 1987 [JP] Japan .................. 62-49095

[51] Int. Cl.⁴ ............................ F16H 57/04
[52] U.S. Cl. .................... 74/467; 184/6.12; 184/11.1
[58] Field of Search ............... 74/467; 184/6.12, 6.23, 184/11.1, 11.2, 13.1

[56] References Cited

U.S. PATENT DOCUMENTS

| | | | |
|---|---|---|---|
| 1,220,810 | 3/1917 | Alquist | 74/467 |
| 1,554,081 | 9/1925 | Garrett | 184/6.12 |
| 2,214,485 | 9/1940 | Short | 184/6.12 |
| 2,292,086 | 8/1942 | Pritchard | 184/11.1 |
| 3,650,353 | 3/1972 | Abbott | 184/6.12 |
| 4,715,244 | 12/1987 | Byrd et al. | 74/467 |
| 4,745,816 | 5/1988 | Horiuchi et al. | 74/467 |

FOREIGN PATENT DOCUMENTS

| | | | |
|---|---|---|---|
| 5817896 | 11/1979 | Japan . | |
| 57-86695 | 5/1982 | Japan | 84/6.12 |
| 62-80359 | 4/1987 | Japan | 74/467 |

Primary Examiner—Rodney H. Bonck
Assistant Examiner—Scott Anchell
Attorney, Agent, or Firm—Oliff & Berridge

[57] ABSTRACT

Herein disclosed is a transaxle casing to be used with a transverse type automatic transmission. An arcuate partition extending from the top to the bottom of a transmission gear case is disposed between the radially outermost rotary member of the transmission gear seat and a cover wall and in front of the transmission gear set with respect to the running direction of a vehicle. An oil sump is disposed below the transmission gear set. Thus, the lubricating oil splashed away the rotary member is guided into an oil return passage extending between the partition and the cover wall and opening into the oil sump so that it may be prevented from being caught again by the transmission gear set and heated to a high temperature.

7 Claims, 2 Drawing Sheets

TRANSAXLE CASING FOR AUTOMATIC TRANSMISSION

BACKGROUND OF THE INVENTION

The present invention relates to a casing structure for accommodating an automatic transmission and, more particularly, to a transaxle casing structure for a transverse type automatic transmission.

As is well known in the art, an automatic transmission employs a plurality of sets of planetary gears each having three elements, one of which is locked whereas the other two elements are used to act as input and output members to establish a variety of speedchange gear ratios. These three elements of the planetary gear sets are locked or engaged by frictional engaging means including clutches and brakes generally of wet type. As a result, the automatic transmission has a number of portions to be lubricated. Especially in the transverse type automatic transmission, as disclosed in Japanese Patent Publication No. 58 - 17896, the members such as the clutches and brakes are arranged as concentrically with the planetary gear set as possible so as to meet the requirement for shortening the total length of the transmission. This concentric arrangement discretely scatters the portions to be lubricated in the radial direction, and these portions are forcibly lubricated by a pump pressure or a centrifugal force. The lubricant having lubricated the tooth surfaces of the gears and the friction members of the wet type multi-disc clutches finally flow down into the oil sump. However, the following problems are caused by the recent tendency of the higher rotations of an engine.

The lubricant having lubricated the planetary gear sets and the wet-type multi-disc clutches is gradually caused to flow radially outwards by the centrifugal force until it is splashed away the rotary members. As a result, the lubricant having been caught by the inner wall of the casing drops into the oil sump so that it may be fed again to the planetary gear sets and so on.

If these circulating cycles are merely repeated, the lubricant is gradually heated to a higher temperature and stirred to form bubbles. These tendencies are the more serious for the more number of revolutions of the engine, i.e., the input to the automatic transmission. As a result, the lubricant level in the oil sump is raised by the volumetirc expansion due to both the rise in the oil temperature and the bubbling due to the stirrig operation. This in turn further increases the stirring of the lubricant. These vicious cycles are repeated to invite problems such as the power loss or the shortenings of the lifetimes of the lubricant itself and the automatic transmission as a whole.

In the case of a high-speed type engine, the centrigual force to be exerted upon the lubricant in the automatic transmission is strengthened to scatter more lubricant so that the lubricant frequently drops again to the rotary members once it has been caught by the inner wall of the casing. As a result, the lubricant cooling rate drops to seriously increase the oil temperature and volumetric expansion so that the pressure in the casing is raised to the higher level. Thus, the lubricant is scattered the more by the centrigual force and is probably blown away the breather.

SUMMARY OF THE INVENTION

It is an object of the present invention to provide a transaxle casing structure which is excellent in the lubricant cooling efficiency.

In order to achieve this object, the transaxle casing structure according to the present invention is equipped with an oil return passage which is formed between a rotary member of a transmission gear set and a cover wall for guiding therein the lubricating oil splashed away the rotary member and into an oil sump. In an automatic transmission including a transmission gear case arranged to have its axis directed transversely of a vehicle, more specifically, the transaxle casing structure according to the present invention comprises: a cover wall covering the outer circumference of said transmission gear set; an oil sump formed below said transmission gear set; and a partition formed to extend beteeen the radially outermost one of rotary members of said transmission gear set and said cover wall at the front side of the vehicle from the top of said outermost rotary member in the rotating direction of the high-speed gear ratio, to define between itself and said cover wall an oil return passage which is formed in front of said rotary member and at its upper portion with an inlet port for guiding therein lubricating oil splashed away said rotary member and with an outlet port opening into said oil sump.

Thus, in the present invention, the lubricant splashed away from the rotary member by the centrifugal force established by the rotations of the member is guided into the oil return passage from the inlet port opened over the rotary member. The lubricant caught by the rotary member by stirring it in the oil sum is splashed by the centrifugal force while being carried upward by the rotary member so that most of it is guided from the inlet port into the oil return passage. The lubricant thus guided into the oil return passage flows therein and drops from the outlet port into the oil sump. As a result, the lubricant splashed once from the rotary member is prevented from dropping again to the rotary member before it returns to the oil sump. Since, moreover, the oil return passage is disposed at the front side of the vehicle, the lubricant flowing therethrough is efficiently cooled down with the coming wind.

DETAILED DESCRIPTION OF THE PREFERRED EMBODIMENT

Figure 1:
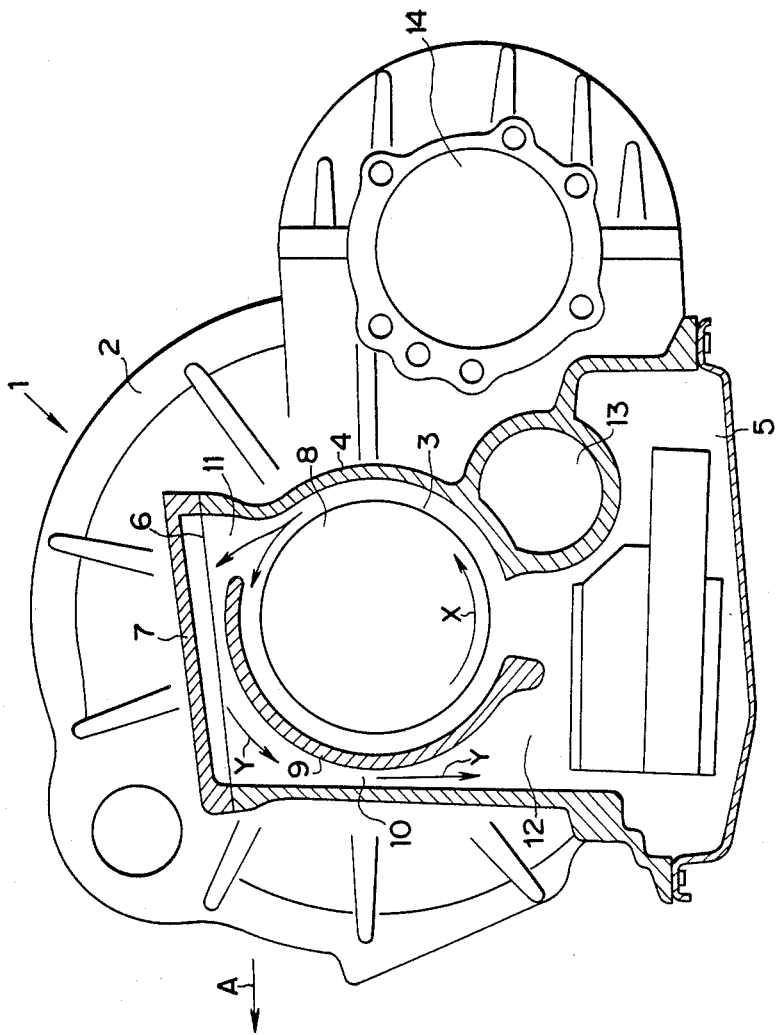
FIG. 1 is a schematic perspective view showing one embodiment of the present invention.

A transaxle casing, as designated generally at 1 in FIG. 1, is one for a transverse type automatic transmission. FIG. 1 is a section taken in the longitudinal direction and shows the transaxle casing which is mounted on a vehicle. The front of this vehicle is indicated by arrow A in FIG. 1. A torque converter housing 2 merges into a trnasmission gear case 3, most of which is covered with a cover wall 4 and the lower side of which opens into an oil sump 5. The front portion of the cover wall 4 forms an upright flat wall directed to the front of the vehicle, but the rear portion forms a wall having an arcuate section. The top of the cover wall 4 is partially opened to form an opening 6, which is sealed up with a cover 7. In short, this cover 7 is sufficient if it can seal up the opening 6. Therefore, the cover 7 may be provided with an auxiliary oil sump (although not shown) if it is formed into a suitable container.

Within an about half range at the vehicular front side between a transmission gear set 8 accommodated in the case 3 and the cover wall 4, there is disposed a partition 9, which has a radius generally equal to the radius of curvature of the rear half of the cover wall 4 to form an oil return passage 10 between itself and the cover wall 4. Specifically, the partition 9 has its one end portion extending over the transmission gear set 8 slightly to the back to form an inlet port 11 for the oil return passage 10. The other end portion of the partition 9 extends below the transmission gear set 8 to define an oulet port 12 between itself and the front portion of the cover wall 4. The outlet port 12 thus defined opens into the oil sump 5.

In FIG. 1, reference numeral 13 designates a countershaft sleeve, and numeral 14 designates a front differential case.

Figure 2:
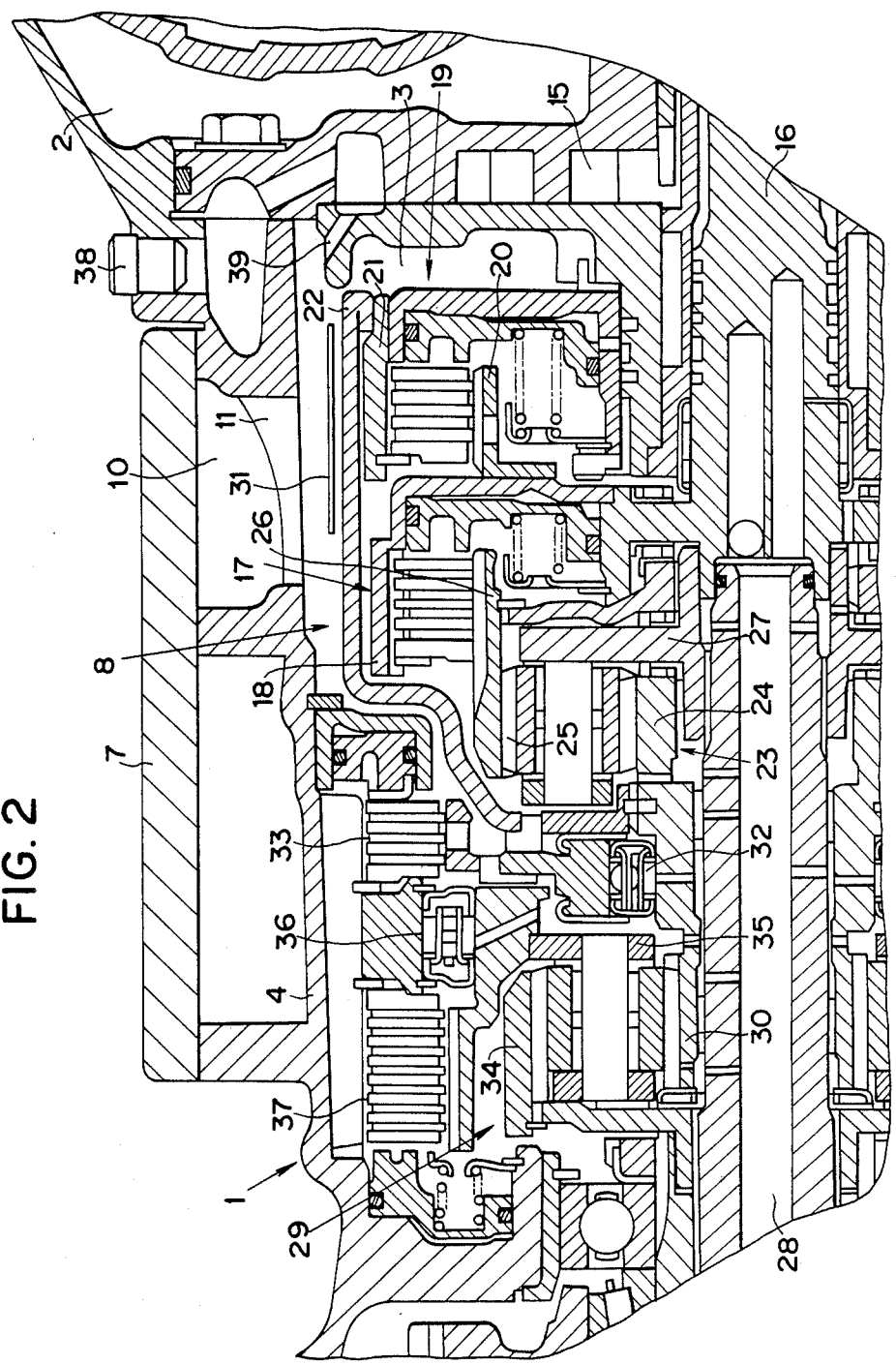
FIG. 2 is a partial section showing the state in which the embodiment is equipped with a transmission gear set and mounted on a vehicle.

FIG. 2 is a sectional veiw showing the state, in which the transmission gear set 8 is accommodated in the aforementioned transaxle casing 1, and is taken from the back of the vehicle. The torque converter housing 2 and the transmission gear case 3 are separated by an oil pump 15, through which extends an input shaft 16. This input shaft 16 is connected to both the drum 18 of a C1 clutch 17 and the hub 20 of a C2 clutch 19. This C2 clutch 19 also has a drum 21 united with a connecting drum 22. This connecting drum 22 is disposed within the inner circumference of the aforementioned partition 9 to enclose the C1 clutch 17, the C2 clutch 19 and a front planetary gear set 23 and is united with the sun gear 24 of the front planetary gear set 23. This front planetary gear set 23 has its ring gear 25 united with the hub 26 of the C1 clutch 17 and its carrier 27 connected to a counter shaft 28. The sun gear 24 of the front planetary gear set 23 is united with the sun gear 30 of a rear planetary gear set 29. These sun gears 24 and 30 are selectively braked by a B1 brake 31, which is disposed around the outer circumference of the connecting drum 22, and is connected through a oneway clutch 32 to a B2 brake 33 so that their rotations in one direction are selectively blocked. The rear planetary gear set 29 has its ring gear 34 connected to the counter shaft 28 and its carrier 35 connected to a predetermined stationary portion through a one-way clutch 36 and a B3 brake 37. Incidentally, a vent hole 39 having communication with a breather 38 is formed in such portion of the upper outer circumference of the aforementioned oil pump 15 as faces the transmission gear case 3. The C1 clutch 17, the C2 clutch 19, the B1 brake 31, the B2 brake 33 and the B3 brake 37 are actuated by their respective hydraulic servo-mechanisms. The automatic transmission thus constructed is followed with an overdrive mechanism, although not shown.

In the transmission gear set 8 described above, the connecting drum 22 united with the sun gears 24 and 30 is rotated at a low or first forward speed in a direction opposite to the forward direction, as indicated at letter X in FIG. 1, and is stopped at a second forward speed but is rotated at a high forward speed or a third or higher speed in the forward direction X. At this high-speed gear ratio, the stirring and splash of lubricating oil will increase. However, the lubricant carried up by the connecting drum 22 is thrown away upward. As a result, most of the lubricant thus splashed away the connecting drum 22 by the centrifugal force is introduced into the oil return passage 10 via the inlet port 11 formed at the end of the partition 9 so that it is isolated from the transmission gear set 8. This reduces the possibility of allowing the lubricant to enter the vent hole 39 for the breather 38. Then, the lubricant is guided to flow in the direction of arrow Y, as shown in FIG. 1, until it is returned to the oil sump 5. While the vehicle is running, the coming wind hits the front portion of the cover wall 4 defining the oil return passage 10 so that the lubricant is air-cooled while flowing in the return passage 10.

In the embodiment thus far described, the oil return passage 10 is formed to face the connecting drum 22 acting as a rotary member. The present invention should not be limite to that formation but may be modified such that the oil return passage is formed to face another rotary member.

As is now apparent from the description thus far described, according to the transaxle casing of the present invention, the lubricating oil splashed away the rotary member accommodated in the axle casing is guided into the oil return passage between the rotary member and the cover wall so that it is returned to the oil sump while being isolated from the rotary member. As a result, the lubricant once splashed away the rotary member is neither caught again nor sheared by the rotary member but is sufficiently coold down in the course of return so that its temperature will not rise. Accordingto the present invention, therefore, it is possible to prevent the rise in the temperature of the lubricant and the resultant rise in the oil level thereby to prevent the shortening of the oil lifetime and the power loss due to the unnecessary stirring of the oil. It is also possible to improve the durability of members to be lubricated such as a wet-type multi-disc clutch and to prevent the speed chane shocks of the automatic transmission, which might otherwise be caused due to changes in the characteristics as a result of the temperature rise. In the present invention, moreover, the oil return passage is disposed in front of the rotary member, as taken in the running direction of the vehicle, so that the effect of cooling the lubricant with the coming wind is improved.

What is claimed is:

1. A transaxle casing structure for accommodating a transmission gear set having a plurality of rotary members arranged on a common axis, the transaxle casing comprising:

a cover wall enclosing said transmission gear set;

an oil sump disposed below said transmission gear set for receiving lubricating oil therein; and a continuous partition disposed between a radially outermost one of said rotary members of said transmission gear set and said cover wall and generally extending from a top of said outermost rotary member to a bottom of said outermost rotary member, an oil return passage being defined between the partition and said cover wall for guiding lubricating oil into said oil sump, said oil return passage having a first opening between one end of said partition and said cover wall and a second opening between another end of said partition and said cover wall.

2. A transaxle casing structure according to claim 1, wherein said partition is disposed in front of said outermost rotary member with respect to the vehicle.

3. A transaxle casing structure according to claim 2, wherein said outermost rotary member is rotated at a high-speed gear ratio in a direction from an upper end of said partition to a lower end of said partition, and wherein the first opening between the partition upper end and said cover wall provides an inlet for said oil return passage and the second opening between the partition lower end and said cover wall provides an outlet for said oil return passage.

4. A transaxle casing structure according to claim 3, wherein the portion of said cover wall at the back of said transmission gear set is arcuate around the axis of said transmission gear set, and wherein said partition is formed into an arcuate shape having a curvature substantially equal to the rear portion of said cover wall.

5. A transaxle casing structure according to claim 1, wherein said cover wall has a removable cover covering its portion above said partition.

6. A transaxle casing structure according to claim 1 wherein said outermost rotary member is a cylindrical connecting drum for transmitting a rotational force.

7. A transaxle casing structure according to claim 1, wherein a lower portion of said outermost rotary member is submerged in lubricating oil in said oil sump.

* * * * *